July 20, 1937.　　　　　G. G. HIRSCH　　　　　2,087,858
JOURNAL BEARING
Filed Nov. 13, 1935　　　2 Sheets-Sheet 1

Inventor
George G. Hirsch
By [signature]
Attorney

July 20, 1937.  G. G. HIRSCH  2,087,858
JOURNAL BEARING
Filed Nov. 13, 1935   2 Sheets-Sheet 2

Inventor
George G. Hirsch
By
Attorney

Patented July 20, 1937

2,087,858

UNITED STATES PATENT OFFICE 2,087,858

JOURNAL BEARING

George Gordon Hirsch, Buffalo, N. Y.

Application November 13, 1935, Serial No. 49,603

1 Claim. (Cl. 308—79.1)

This invention relates to improvements in friction type journal bearings, such as the axle journal bearings of railway vehicles, to wit, locomotives, locomotive tenders, freight and passenger cars, and particularly to a novel construction of journal bearing providing better lubrication, reduction of wear and tear on and liability of injury to the bearing, as well as the avoidance of hot bearings.

The accumulation of compacted waste particles under the crown or main bearing area of journal bearings of the conventional type, which are often referred to as waste grabs, is largely responsible for the unequal distribution of lubricant to the bearing, and contributes to a large percentage of train failures on railroads due to what are known as hot journals. Such journal bearings, as commonly constructed, are also subject to undue friction and heating due to the imperfect distribution of oil longitudinally as well as laterally over the bearing surfaces.

One object of my invention is to provide a construction of journal bearing whereby these objections are overcome, better lubrication secured, and liability of undue heating of and injury to the bearing prevented.

Another object of my invention is to provide means for the collection and reduction of the waste grabs or particles and the collection and even distribution of lubricant, longitudinally as well as laterally over the crown bearing area of the journal bearing, in either direction of rotation of the axle journal.

Still another object of my invention is to provide a liner for the journal bearing embodying a novel construction and arrangement of oil and waste grab collecting and distributing grooves whereby maximum efficiency of lubrication is obtained without impairing the strength of the liner.

Still another object of the invention is to provide a novel construction and arrangement of axially extending main lubricant and waste collecting grooves and rows of side lubricant feed grooves acting alternately as input and output grooves for the feed of lubricant to and from the main grooves and serving additionally to effect a longitudinal feed of the oil over the bearing surface of the liner.

Still another object of the invention is to provide means for reinforcing the liner at the points where the main distributing grooves are formed and interlocking the liner with the bearing brass so as to prevent lateral displacement of the liner.

With these and other objects in view, the invention consists of the features of construction, combination and arrangement of parts, hereinafter fully described and claimed, reference being had to the accompanying drawings, in which:—

Figure 1:
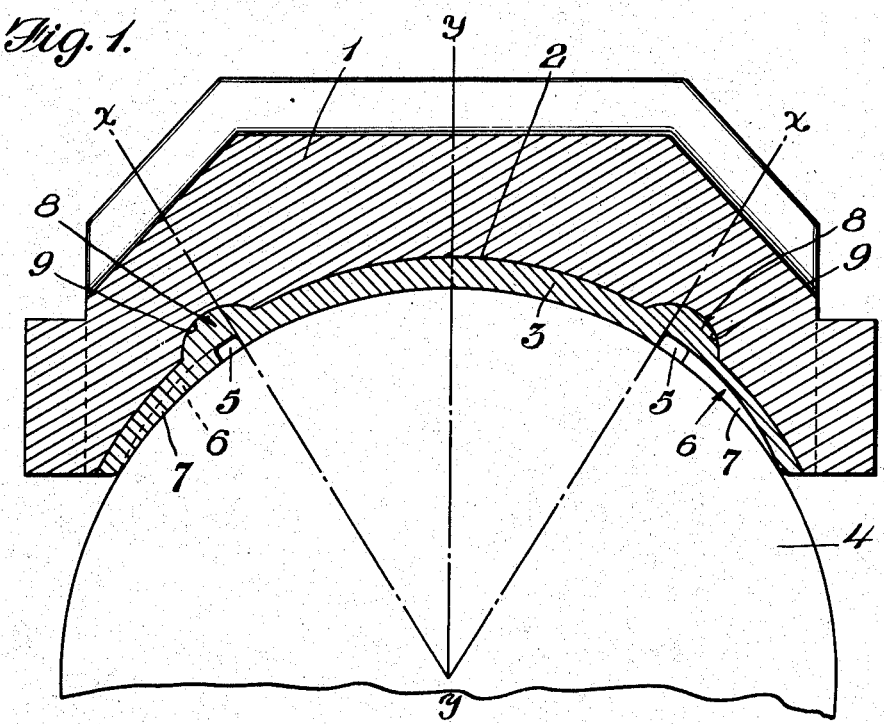
Fig. 1 is a vertical section, taken on line 1—1 of Fig. 2, through the bearing brass and liner, and showing the same in operative relation to the axle journal.

In the practical embodiment of my invention as herein shown, 1 designates the bearing brass of a car journal bearing which may be of standard conventional type and interchangeable with like bearings for application to a standard railway journal box. The lower or bearing side or face 2 of this brass is of concaved form and extends, as usual, on the arc of a circle and is fitted with a liner 3 of babbitt metal or similar soft metal, the lower or bearing face of which liner contacts with the upper surface of the axle journal 4. The general arrangement of these parts, and the extent of bearing of the liner on the journal, may accord with the customary practice, in which the major portion of the load is carried by the main or crown bearing area or portion of the liner between the points indicated by the radial lines $x$—$x$ passing from the center of the journal through the liner at the lateral extremes of the crown bearing area disposed equidistantly on opposite sides of the vertical center line $y$—$y$ of the bearing. This portion of the bearing liner not only sustains the major portion of the load and wear but is subjected in operation to shocks and the greatest rise in temperature, and it is therefore highly important that this area be adequately and uniformly lubricated at all times.

Lubrication of this crown bearing area is generally very faulty in bearings of ordinary construction, for the reason that no effective means is ordinarily provided for the supply of lubricant to and its uniform distribution over the main or crown bearing surface. The amount of lubrication ordinarily effected is frequently reduced by particles from the lubricating waste in the journal box, commonly known as waste grabs, being taken up and compacted between the bearing surfaces, thus interfering with the free flow of the lubricant. Difficulty is also encountered in lubricating the bearing surfaces at slow speeds and when the parts are stationary for a time, after a period of running, the oil being squeezed out from between the bearing surfaces so that direct metal contact is allowed, and the supply of lubricant is also reduced during periods of reversal of rotation of the bearing, since a certain period of time must lapse before sufficient reverse flow of lubricant is secured in order to properly lubricate the bearings. These difficulties in lubrication frequently cause hot boxes or undesirable heating of the bearing, with liability of breakage of the lining or other injury thereto, and it is the primary object of my invention to provide means of a simple character for overcoming these objections and difficulties.

In accordance with my invention the bearing face of the liner 3 is provided with a pair of axially extending oil and waste grab collecting and oil distributing grooves 5, which extend substantially the full distance from end to end of the liner. These grooves are arranged adjacent to or along the lateral margins of the crown bearing surface of the liner, equidistantly on opposite sides of the vertical center line y—y of the bearing, such crown bearing surface between said grooves being smooth and unobstructed so as to allow free and unimpeded flow of lubricant and so as to leave the crown bearing surface free of grooves or other indentations impairing its thickness and strength. The function of these grooves 5 is to collect oil and the waste grabs and to retain the grabs within the grooves with a store of oil, which is distributed therefrom, thus forming wick lubricators holding sufficient oil for lubrication of the bearing surface even at times when otherwise the bearing surface would become dry. The wick grabs held in these grooves will be prevented from becoming compacted and causing friction and retained in a soft state so that they will effectually hold oil, whereby in the rotation of the axle journal in either direction uniform lubrication of the crown bearing surface will be secured even at low speeds or during periods when the feed of oil from the waste is not sufficient owing to change in the direction of rotation of the axle journal.

In order to still further increase the efficiency of the bearing I provide the bearing face of the liner with rows of transverse oil feed grooves 6 separated by intervening ribs 7, a row of such grooves being provided along each longitudinal edge of the liner and between the same and the adjacent axially extending groove 5. The outer end of these grooves 6 do not project through the marginal longitudinal edges of the liner, which lie in contact with the surface of the journal, but begin at a point adjacent thereto and from this point each groove 6 extends toward and connects at its opposite end with the adjacent axially extending groove 5, the groove 6 gradually increasing in depth toward the groove 5 so as to provide for the feed of oil and waste particles thereto in a free manner and without interference. The grooves 6 are preferably, as shown, arranged obliquely, or at a suitable angle to the grooves 5 and longitudinal axis of the liner so as to cause the oil to flow both longitudinally and transversely of the bearing, whereby an even and regular flow of the oil to the grooves 5 is ensured and longitudinal and lateral distribution of the lubricant over the bearing surfaces also ensured. These rows or sets of grooves 6 serve alternately as input and output grooves at opposite sides of the liner in the opposite directions of rotation of the axle journal, as will be readily understood. In the operation of the bearing as thus far described it will be evident that in either direction of rotation of the axle journal, the oil and particles of waste passing upwardly in such direction of rotation of the journal will be guided by the groove 6 at one side of the liner and conducted to the adjacent axially extending distribution groove 5, from which the lubricant will be distributed over the crown bearing surface, thence caused to pass into the other axially extending collecting and distributing groove 5, and then discharged at the opposite side of the liner through the other set of grooves 6, waste contained in the grooves being maintained in a soft state and prevented from packing and serving to hold a sufficient amount of oil to keep the bearing surfaces lubricated at all times. This construction and arrangement of the grooves ensures a most efficient type of lubricant to prevent the bearing from becoming dry or overheated without the necessity of providing grooves in the crown portion proper of the lining and unduly impairing the strength and amount of bearing material in the crown bearing area.

In order to enable the grooves 5 to be made of effective depth the outer or near face of the lining is provided with reinforcing ribs 8, disposed in alinement with the grooves 5 and serving to maintain the initial strength of these grooved portions of the liner, which would otherwise be weakened by the formation of the grooves. These ribs 8 fit within receiving grooves 9 formed in the surface 2 of the bearing brass 1, whereby they form an interlocking connection between the liner and the bearing brass to prevent liability of lateral displacement of the liner and injury thereto, such as might otherwise be caused when the liner becomes worn and is subjected to side pressures, as during changes in the direction of rotation of the axle journal.

Figure 4:
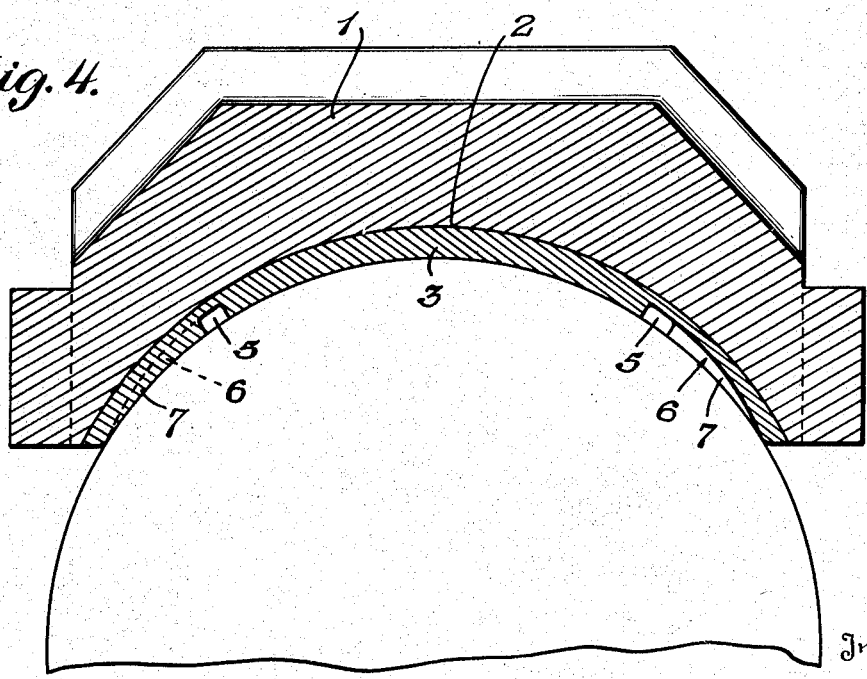
Fig. 4 is a view similar to Fig. 1 showing a modification.
Figure 2:
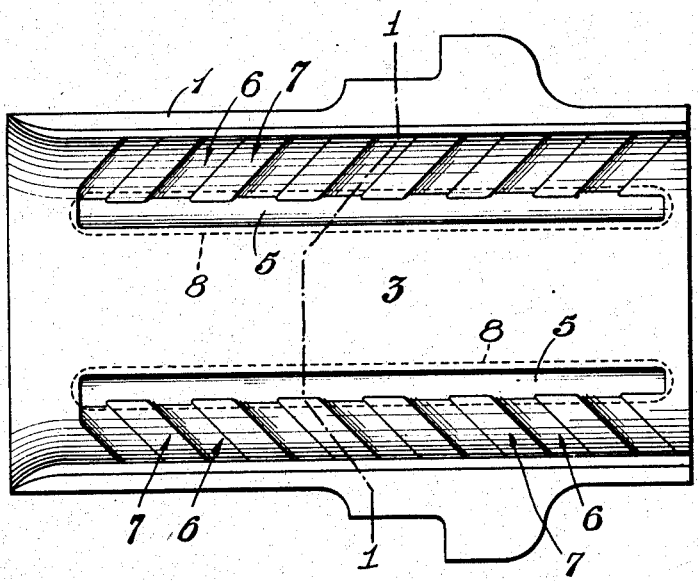
Fig. 2 is a plan view of the liner.
Figure 3:
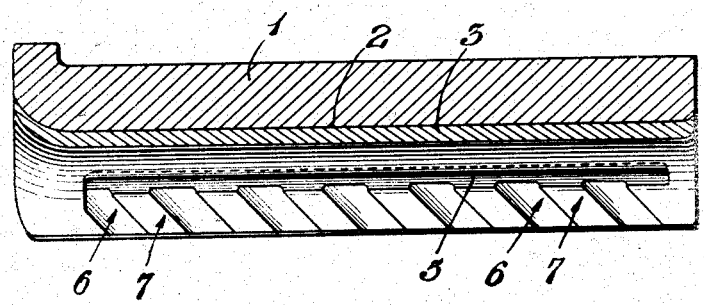
Fig. 3 is a vertical longitudinal section through the liner.

In the modified form of my invention shown in Fig. 4 the construction of the bearing brass and liner is the same as that disclosed in Figs. 1–3, except that the ribs 8 on the liner and receiving grooves 9 in the bearing brass are dispensed with, which construction, while not so desirable, may be employed under some conditions.

From the foregoing description, taken in connection with the drawings, the construction and mode of operation of my improved journal bearing will be readily understood by those versed in the art without a further and extended description, and it will be seen that the invention provides a bearing having a liner of maximum strength and durability while embodying means for catching and retaining the waste grabs and providing for uniform and efficient lubrication and preventing overheating of the lining in an extremely simple manner. While the structural features disclosed are preferred it will, of course, be understood that changes in the form, proportion and arrangement of parts falling within the scope of the appended claims may be made, without departing from the spirit or sacrificing any of the advantages of the invention.

What I claim is:—

A liner for bearing brasses of journal bearings and the like provided with an inner bearing face having a crown portion continuously smooth or unbroken longitudinally of said face and transversely between the lateral margins of the crown portion, longitudinal oil distributing and waste grab collecting grooves extending along the lateral margins of the crown portion, and longitudinal rows of regularly spaced and parallel alternately arranged ribs and oil conducting grooves disposed between the respective longitudinal grooves and the marginal side edges of the liner, the ribs and grooves of each row extending from adjacent the marginal side edge of the liner to the longitudinal groove, between which they lie at an oblique angle in a direction toward the groove and one end of the liner to carry streams of oil upwardly at the side of the liner to the top of the liner and longitudinally in a direction toward an end of the liner, each groove having its outer end terminating short of the adjacent side margin of the liner and thence gradually increasing in depth toward and being of maximum depth at its inner end intersecting the longitudinal groove toward which it leads.

GEORGE GORDON HIRSCH.